United States Patent

Bober et al.

[11] Patent Number: 6,161,643
[45] Date of Patent: Dec. 19, 2000

[54] SYSTEM OF CONTROLLING TORQUE TRANSFER IN A MOTOR VEHICLE AND RELATED METHOD

[75] Inventors: Patricia M. Bober, Farmington Hills; Mark E. Dober, Rochester Hills; Alex J. Petrusha, Plymouth, all of Mich.

[73] Assignee: DaimlerChrysler Corporation, Auburn Hills, Mich.

[21] Appl. No.: 09/205,985

[22] Filed: Dec. 4, 1998

Related U.S. Application Data

[60] Provisional application No. 60/069,175, Dec. 10, 1997.

[51] Int. Cl.$^7$ ................................... F16H 48/30
[52] U.S. Cl. ........................... 180/249; 180/197
[58] Field of Search ................... 180/248, 249, 180/250, 233, 247, 197

[56] References Cited

U.S. PATENT DOCUMENTS

| | | |
|---|---|---|
| 3,040,600 | 6/1962 | Mueller . |
| 3,735,764 | 5/1973 | Balev et al. . |
| 3,748,928 | 7/1973 | Shiber . |
| 3,828,877 | 8/1974 | Fogelberg ............... 180/249 |
| 4,012,968 | 3/1977 | Kelbel . |
| 4,727,966 | 3/1988 | Hiramatsu et al. . |
| 4,773,500 | 9/1988 | Naito et al. ............... 180/233 |
| 4,966,249 | 10/1990 | Imaseki ................... 180/233 |
| 5,080,187 | 1/1992 | Asano et al. ............. 180/248 |
| 5,106,347 | 4/1992 | Takemura et al. . |
| 5,299,986 | 4/1994 | Fabris et al. ............. 475/88 |
| 5,310,388 | 5/1994 | Okeuglu et al. . |
| 5,320,586 | 6/1994 | Baxter, Jr. . |
| 5,536,215 | 7/1996 | Shaffer et al. . |
| 5,595,214 | 1/1997 | Shaffer et al. . |
| 5,609,219 | 3/1997 | Watson et al. ........... 180/248 |
| 5,611,746 | 3/1997 | Shaffer . |
| 5,655,618 | 8/1997 | Wilson et al. ........... 180/197 |
| 5,655,983 | 8/1997 | Dick . |
| 5,702,319 | 12/1997 | Baxter, Jr. . |
| 5,704,863 | 1/1998 | Zalewski et al. ........ 475/88 |
| 5,709,627 | 1/1998 | Teraoka . |
| 5,735,764 | 4/1998 | Shaffer et al. ........... 475/88 |

FOREIGN PATENT DOCUMENTS 0 396 323  11/1990  European Pat. Off. .

OTHER PUBLICATIONS

Asha Corporation brochure entitled "Gerodisc", copyright 1994, 4 pages.

*Primary Examiner*—Kevin Hurley
*Attorney, Agent, or Firm*—Marc Lorelli

[57] ABSTRACT

A system for controlling torque transfer in a motor vehicle includes a transfer case, a front inter-axle differential unit and a rear inter-axle differential unit. The transfer case is operative for automatically transferring torque between front and rear pairs of wheels. The front inter-axle differential unit is operative for automatically transferring torque between the wheels of the front pair of wheels. The rear inter-axle differential unit is operative for automatically transferring torque between the wheels of the rear pair of wheels. Under extreme operating conditions, the system is operative for delivering substantially all torque to a single tractive wheel.

11 Claims, 7 Drawing Sheets

SYSTEM OF CONTROLLING TORQUE TRANSFER IN A MOTOR VEHICLE AND RELATED METHOD

This is a conventional application claiming priority to a provisional application filed Dec. 10, 1997, and assigned U.S. Serial No. 60/069,175.

BACKGROUND OF THE INVENTION

1. Technical Field

The present invention generally pertains to motor vehicles. More particularly, the present invention pertains to a system of controlling torque transfer in a motor vehicle and a related method. More specifically, but without restriction to the particular embodiment and/or use which is shown and described for purposes of illustration, the present invention relates to a method and apparatus for automatically and independently transferring torque between the four wheels of a motor vehicle.

2. Discussion

In the increasingly competitive automobile industry, many companies have sought to introduce sport utility vehicles in recent years. Most such vehicles are designed primarily for "on-road" traveling. Various systems for sport utility vehicles are currently utilized for limiting differential speed, or transferring torque, between differentially rotating shafts. For example, it is known to use "on-demand" power transfer systems for automatically directing power to the non-driven wheels, without any input or action on the part of the vehicle operator, when traction is lost at the driven wheels. A four-wheel drive vehicle conventionally employs front and rear drive axles, having front and rear differentials, respectively, for driving each wheel of the vehicle. A torque transfer case is generally used to distribute torque to the front and rear drive axles, and may be provided with a differential for dividing torque in a desired ratio.

A selectively engagable clutch has been used to limit differential rotation between the front and rear axles of the vehicle. The clutch is operative to lock the differential upon sensing a predetermined differential rotation between front and rear output shafts of the transfer case. Activation of the clutch may be controlled by an electronic control system and associated speed sensors measuring speeds of the front and rear output shafts of the transfer case. While an electronic control system can again be useful to limit differential speed between the differentially rotating members, in these examples as well as others, a simplified and less costly mechanical system, retaining advantages of this type of control system would be desirable.

It is also known to incorporate a traction control device having a hydraulic coupling. The hydraulic coupling incorporates a gerotor pump and a multi-plate clutch into a common assembly for transferring torque on-demand in response to a speed differential between the driven and non-driven shafts. Known hydraulic coupling mechanisms have utilized hydraulic pumps which pump fluid in response to relative rotation between two rotating members for purposes of rotatably coupling the two differentially rotating members or shafts. These systems generally include a hydraulic pump coupled to the two differentially rotating shafts, which in turn controls a hydraulically actuated piston. The piston in turn acts on a clutch assembly coupling the two rotating shafts. The hydraulic pump provides volumetric flow of fluid that varies in direct proportion to the relative or differential rotational speeds of the rotating shafts. Generally, the hydraulic piston is equipped with an outlet orifice that restricts the outflow of fluid from the piston in order to generate a back pressure of fluid, which drives the piston to engage the clutch mechanism. Such systems therefore provide a capacity for torque transfer between the rotating members that varies in direct proportion to the relative or differential speed between the two shafts.

Many known systems for controlling wheel slip operate to slow rotation of the faster or slipping wheel. Such systems electronically apply anti-braking system (ABS) technology to reduce the rotational speed of a slipping wheel. While effective for controlling slip, this type of traction control system functions to effectively retard vehicle performance. In this regard, under conditions in which one or more wheels are on non-tractive surfaces and substantially all available torque from the engine is needed to propel the vehicle, such traction control systems for limiting differential speed render the vehicle difficult, if not impossible, to maneuver. For example, where such a vehicle is ascending a substantial grade and three of the wheels are simultaneously on non-tractive surfaces (e.g. snow, ice or mud), the ABS technology is employed to dampen the rotational speed of the slipping wheels (e.g. faster spinning wheels). Effectively only twenty-five percent of the torque produced by the engine is delivered to the remaining non-slipping wheel. Even if the torque delivered to the non-slipping wheel is sufficient to propel the vehicle up the steep grade, the vehicle will not respond efficiently.

Most known sport utility vehicles are designed primarily for "on-road" traveling, while giving the impression of having good "off-road" capability as well. Yet, the need still exists for a sport utility vehicle to achieve uncompromising off-road characteristics, while still satisfying on-road driving expectations to thereby reach a new level of vehicle performance.

SUMMARY OF THE INVENTION

Accordingly, it is a general objective of the present invention to provide a unique system and method for controlling torque transfer in a motor vehicle and which is capable of achieving a new level of performance.

It is another object of the present invention to provide a system for automatically and independently transferring torque between any of the four wheels of a motor vehicle.

It is another object of the present invention to provide a system for directing substantially all the torque generated by an engine to one or more non-slipping wheels, that is yet both highly reliable and low cost.

It is another object of the present invention to provide a system for automatically transferring torque between the wheels of a motor vehicle which is not computer controlled.

It is another object of the present invention to provide a system for automatically transferring torque between the wheels of a motor vehicle which is not dependent upon ABS interaction.

In one form, the present invention provides a system for transferring drive torque to the front and rear pairs of wheels of a motor vehicle. The system includes a front axle assembly having a front differential unit interconnected to the front pair of wheels through a front pair of axle shafts and a rear axle assembly including a rear differential unit interconnected to the rear pair of wheels through a rear pair of axle shafts. The system further includes a transfer case interconnected to the front and rear axle assemblies through a front prop shaft and a rear prop shaft, respectively. The front differential unit is operative for automatically transferring torque between the front pair of axle shafts in response to a first predetermined speed differential therebetween. The rear differential unit is operative for automatically transferring torque between the rear pair of axle shafts in response to a second predetermined speed differential therebetween. The transfer case includes a torque transfer mechanism for automatically transferring torque between the front and rear prop shafts in response to a third predetermined speed differential therebetween.

In another form, the present invention provides a method for transferring torque in a motor vehicle having a front pair of wheels and a rear pair of wheels. The method comprising the following general steps:

1. Providing a front axle assembly including a front differential unit interconnected to the front pair of wheels through a front pair of axle shafts.
2. Providing a rear axle assembly including a rear differential unit interconnected to the rear pair of wheels through a rear pair of axle shafts.
3. Providing a transfer case interconnected to the front and rear axle assemblies through a front prop shaft and a rear prop shaft, respectively.
4. Automatically transferring torque between the front pair of axle shafts in response to a first predetermined speed differential therebetween.
5. Automatically transferring torque between the rear pair of axle shafts in response to a second predetermined speed differential therebetween.
6. Automatically transferring torque between the front and rear prop shafts in response to a third predetermined speed differential therebetween.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
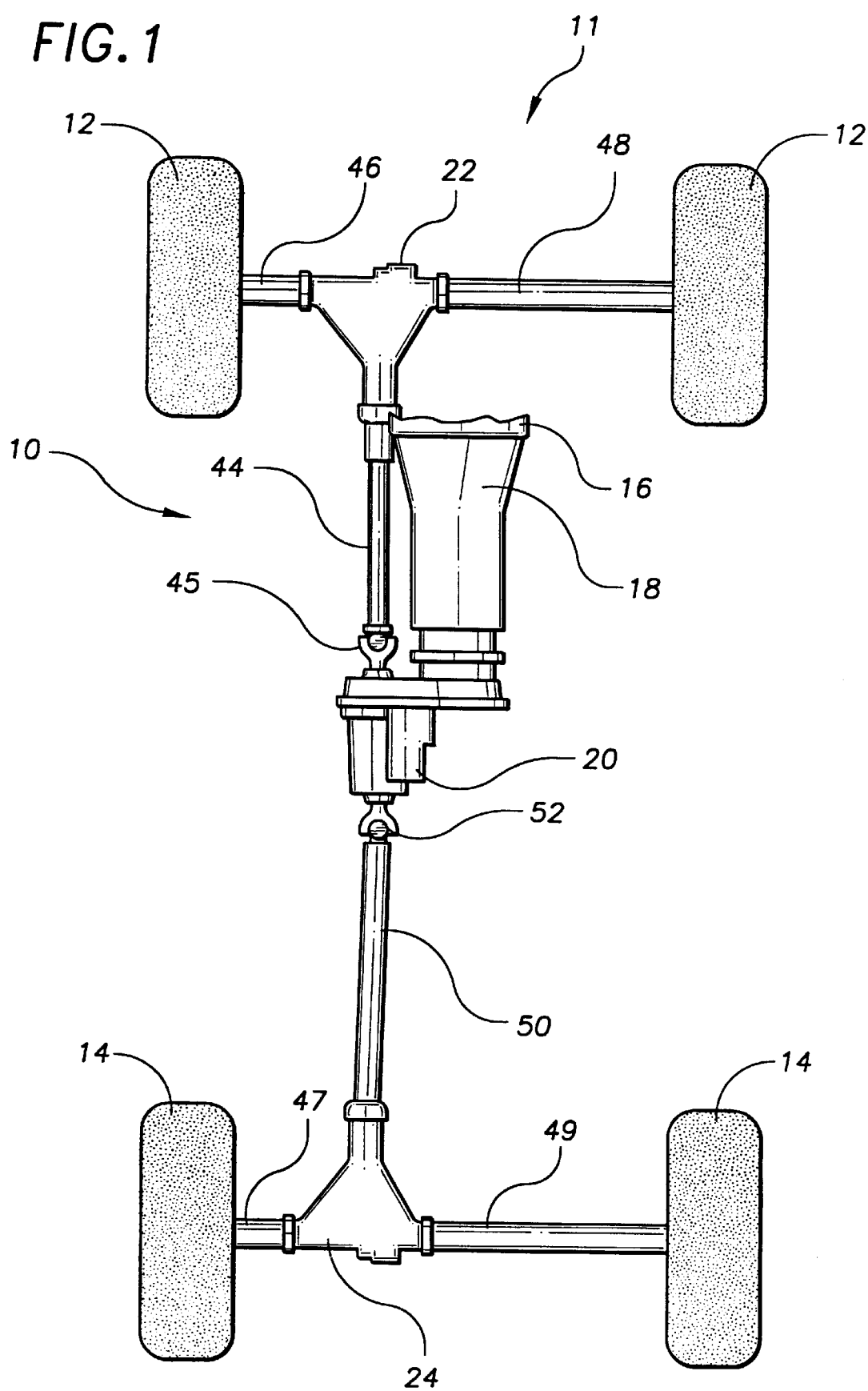
FIG. 1 is a simplified view of a system for controlling torque transfer constructed in accordance with the teachings of the preferred embodiment of the present invention shown operatively associated with a motor vehicle.

With initial reference to FIG. 1, a torque transfer system constructed in accordance with the teachings of a preferred embodiment of the present invention is identified with reference numeral 10. The torque transfer system 10 is shown operably installed between driven and non-driven wheels of a four-wheel drive motor vehicle 11, which is shown only in part to highlight the torque transfer system 10. However, it should be understood that motor vehicle 11 could be any on-road and off-road passenger carrying vehicle, such as a sport utility vehicle. The motor vehicle 11 generally has a pair of front wheels 12 and a pair rear wheels 14. Both pairs of wheel 12 and 14 are drivable from a source of power, such as an engine (partially shown at 16), through a transmission 18 which may be of either the manual or automatic type. In the particular embodiment shown, the motor vehicle 11 is a rear wheel drive vehicle operable for normally driving the rear wheels 14 in a two-wheel drive mode.

In general, the torque transfer system 10 of the present invention includes a transfer case 20, a front inter-axle differential unit 22 and a rear inter-axle differential unit 24. The transfer case 20 is operative for automatically transferring torque between the front and rear pairs of wheels 12 and 14. The front inter-axle differential unit 22 is operative for automatically transferring torque between the wheels of the front pair of wheels 12. The rear inter-axle differential unit 24 is operative for automatically transferring torque between the wheels of the front pair of wheels 14.

I. Transfer Case

With continued reference to FIG. 1 and additional reference to FIGS. 2 and 3, an exemplary transfer case 20 for incorporation into the torque transfer system 10 of the present invention will be discussed in detail. One suitable transfer case 20 is commercially available from New Venture Gear, Inc. of Troy, Mich. as part number NV 247. However, as will be discussed below, the transfer case 20 of the present invention is uniquely tuned to accomplish the operational objectives of the present invention.

Figure 2:
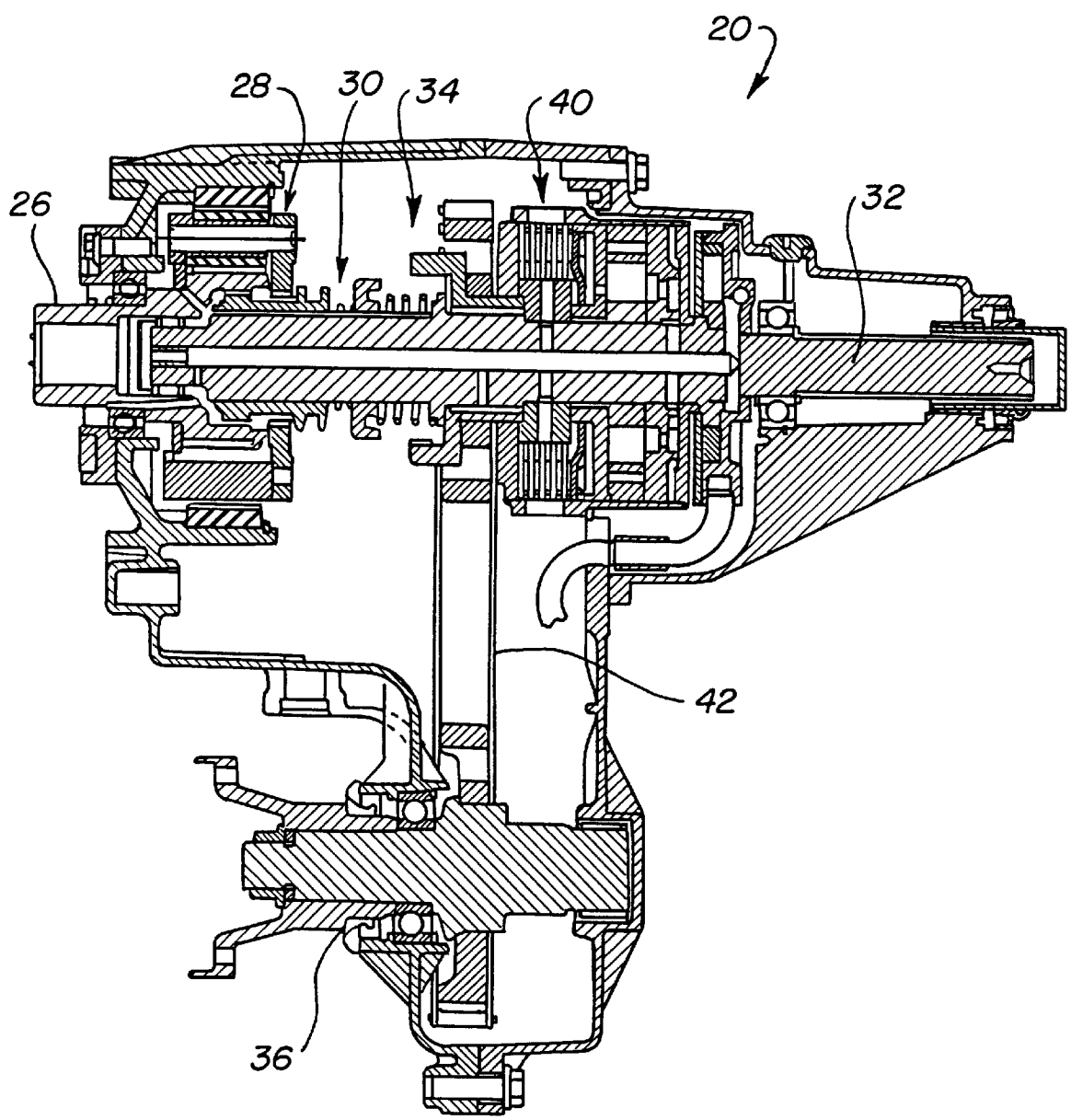
FIG. 2 is a cross-sectional view of an exemplary transfer case associated with the system of controlling torque transfer of the present invention which includes a torque transfer mechanism for automatically transferring torque between front and rear prop shafts in response to a predetermined speed differential therebetween.
Figure 3:
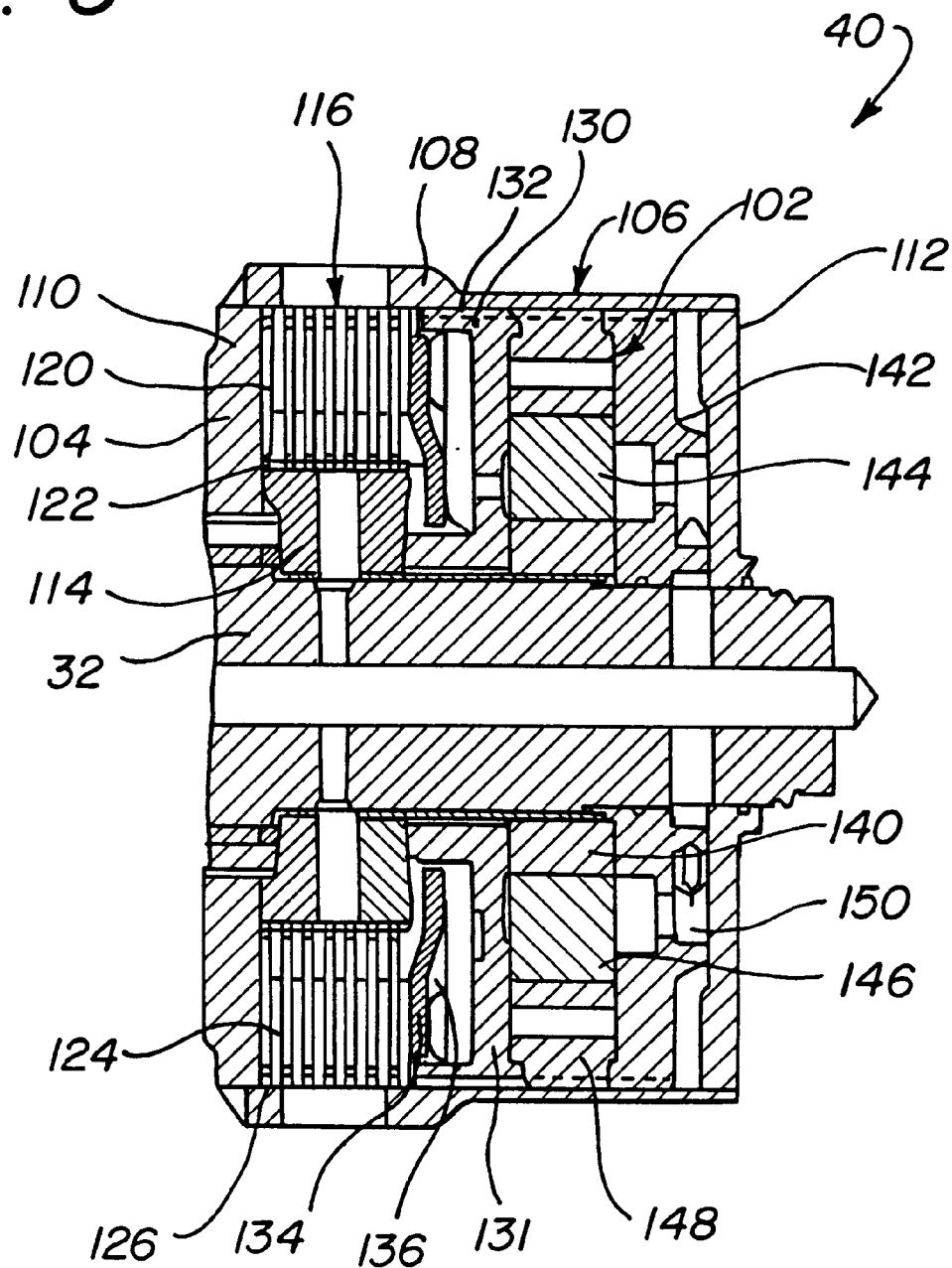
FIG. 3 is an enlarged cross-sectional view of the hydraulic coupling of the transfer case of FIG. 2.

The exemplary transfer case 20 is shown in FIG. 2 to be generally equipped with: an input shaft 26 rotatably driven by the engine 16 through the transfer case 20; a planetary-type gear reduction unit 28 rotatably driven by the input shaft 26 at a reduced speed ratio relative thereto; a range shift mechanism 30 for selectively coupling a rear output shaft 32 to either the input shaft 26 or the gear reduction unit 28; a lock-out mechanism 34 for selectively coupling a front output shaft 36 to rear output shaft 32 to establish a "part-time" low, four-wheel drive mode; and a hydraulic coupling 40 for automatically controlling the torque transferred from the rear output shaft 32 to front output shaft 36 for establishing an "on-demand" four-wheel drive mode. Such on-demand torque transfer is accomplished without any input from the vehicle operator in response to the occurrence of a predetermined speed differential between the rear output shaft 32 and the front output shaft 36. A chain drive arrangement 42 is shown for transmitting drive torque from the rear output shaft 32 to the front output shaft 36.

With continued reference to FIG. 2 and additional reference to FIG. 3, an exemplary form of the hydraulic coupling 40 will be described. The hydraulic coupling 40 is operatively coupled to the rear output shaft 32 and the front output 36. As will become apparent below, the hydraulic coupling 40 is adapted to automatically and progressively couple rotating shafts 32 and 36 in response to rotational speed differences therebetween. In general, the hydraulic coupling 40 is illustrated to include a hydraulic pump 102 and a transfer clutch 104 that are operably arranged to automatically and progressively transfer drive torque from the rear output shaft 32 to front output shaft 36 in response to rotational speed differences therebetween. Preferably, the hydraulic pump 102 is a gerotor pump and transfer clutch 104 is a hydraulically-actuated multi-plate clutch assembly, both of which are confined within a common cover assembly 106. The cover assembly 106 includes a cylindrical outer drum 108 and front and rear cover plates 110 and 112, respectively, secured (i.e., welded) thereto. The front cover plate 110 is driven by the input shaft 26. The rear cover plate 112 is driven by the rear output shaft 32.

The transfer clutch 104 is shown to include a clutch hub 114 fixed via a splined connection 38 to the rear output shaft 32, and an interleaved clutch pack 116 disposed within a chamber or gallery 118 comprised of a plurality of inner clutch plates 120 fixed via splined connections 122 to the clutch hub 104. The inner clutch plates 120 are alternately interleaved with a plurality of outer clutch plates 124 fixed via splined connections 126 to the outer drum 108. Alternatively, the clutch hub 114 may be eliminated and the inner clutch plates 120 may be splined directly to the rear output shaft 32.

The transfer clutch 104 further includes a piston assembly 130 comprised of a piston housing 131 that is fixed via a splined connection 132 for rotation with the outer drum 108, and an actuation member or piston 134 disposed in an annular pressure chamber 136. The piston 134 is supported for axial sliding movement within the pressure chamber 136 relative to the interleaved multi-plate clutch pack 116 for applying a compressive clutch engagement force on the clutch pack 116, thereby transferring drive torque from the rear output shaft 32 to the front output shaft 36. As will become more apparent below, the amount of drive torque transferred is progressive in that it is proportional to the magnitude of the clutch engagement force exerted by the piston 134 on the clutch pack 116 which, in turn, is a function of the fluid pressure within pressure chamber 136. Moreover, the magnitude of the fluid pressure in pressure chamber 136 delivered thereto by the hydraulic pump 102 is largely a function of the speed differential between the input shaft 26 and rear output shaft 32.

The hydraulic pump 102 includes piston 56, a valving arrangement within the piston housing 131 that is operable for controlling the delivery of fluid to pressure chamber 136, a gerotor pump assembly 140, an inlet plate 142, and the rear cover plate 112. The gerotor pump assembly 140 is a three component arrangement including a pump ring or inner rotor 144, an outer rotor 146, and a stator ring 148 that is operably disposed therebetween. While not specifically shown, the pump ring 144 has a plurality of external teeth that rotate concentrically relative to the rear output shaft 32 about a common rotational axis. The stator ring 148 includes a plurality of internal lobes and has an outer circumferential edge surface that is journally rotatably supported within a circular internal bore formed in the outer rotor 146. The internal bore is offset from the rotational axis such that, due to meshing of the internal lobes of the stator ring 148 with the external teeth of the pump ring 144, relative rotation between the pump ring 144 and the outer rotor 146 causes eccentric rotation of the stator ring 148. This eccentric rotary arrangement results in a pumping action for supplying fluid to the pressure chamber 136.

In operation, fluid is drawn from a supply reservoir 150 into a suction side of the gerotor pump assembly 140 when a predetermined speed differential between input and rear output shafts 26 and 32 occurs and corresponding relative motion between the components of the gerotor pump assembly 140 commences. Fluid in the supply reservoir 150 is drawn into the suction side of the gerotor pump assembly 140. The fluid is then transferred into the discharge side of gerotor pump assembly 140 and into the pressure chamber 136 via pressure ports, thereby pressurizing the fluid and axially translating the piston 134 toward the clutch pack 104.

II. Front and Rear Inter-Axle Differential Units

The front and rear inter-axle differential units 22 and 24 of the torque transfer system 10 and the interconnection to the associated pair of wheels 12 and 14 will be understood to be substantially identical. For this reason, this detailed description will be primarily directed to the front inter-axle differential unit 22. The construction of the rear differential unit 24 will be readily apparent therefrom. While there is no requirement for the differential units 22 and 24 to be identical or substantially identical, a number of manufacturing, supply and repair efficiencies may be achieved when these units 22 and 24 are interchangeable.

Figure 4:
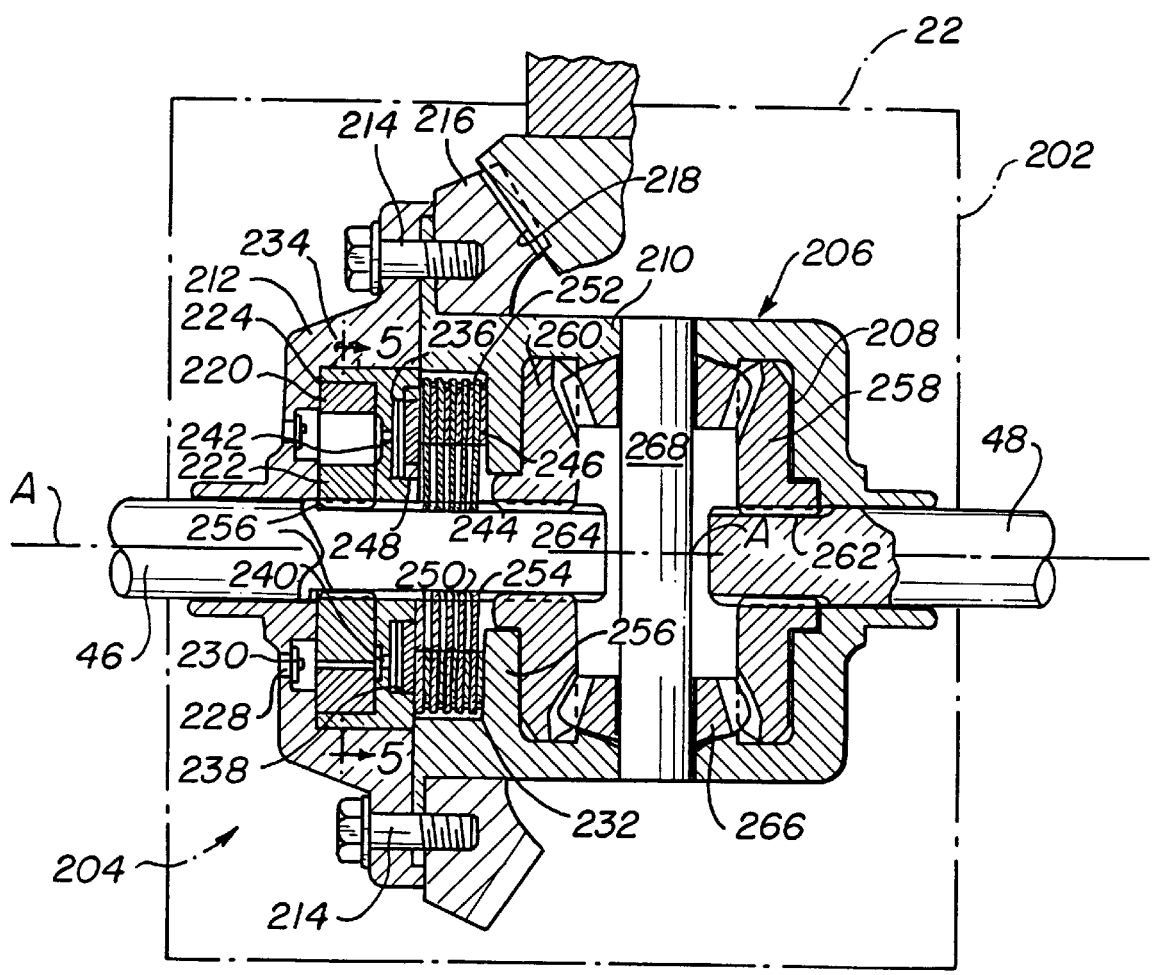
FIG. 4 is a cross-sectional view of an exemplary front inter-axle differential unit associated with the system of controlling torque transfer of the present invention which is operative for automatically transferring torque between the front pair of axle shafts in response to a predetermined speed differential therebetween.
Figure 5:
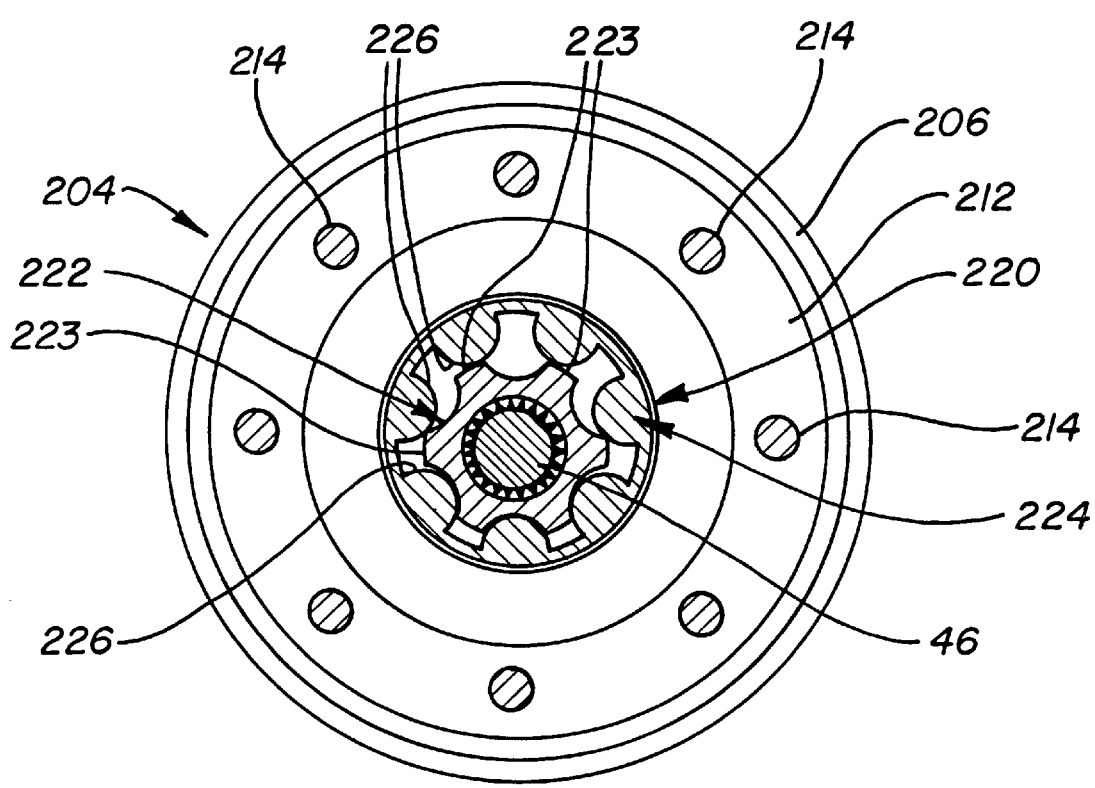
FIG. 5 is a cross-sectional view taken along the line 5—5 of FIG. 4.

With reference to FIGS. 1, 4 and 5, an exemplary front inter-axle differential unit 22 for incorporation into the torque transfer system 10 of the present invention will be discussed in further detail. One suitable inter-axle differential unit 22 is shown in U.S. Pat. No. 5,735,764, which is hereby incorporated by reference as if fully set forth herein. Another suitable inter-axle differential unit is commercially available from Dana Corporation of Fort Wayne, Ind. As with the transfer case 20, it should be understood that the inter-axle differential unit 22 is uniquely tuned to accomplish the operational objectives of the present invention. Further, the tuning of the inter-axle differential units 22 and 24 is cooperatively done with the tuning of the transfer case 20. This aspect of the present invention will be addressed further below.

The inter-axle differential unit 22, which is part of a front axle assembly, is rotatively driven from the vehicle engine 16 by a front prop shaft 44. The prop shaft 44 is coupled to the front output shaft 36 through a constant velocity universal joint (CV joint) 45. The differential unit 22 operates to drive a pair of axle shafts 46 and 48 of the front axle assembly. The differential unit 22 includes a housing 202 for containing hydraulic fluid and having suitable seals through which the pair of axle shafts 46 and 48 and the front prop shaft 44 project. Within the housing 202, the differential unit 22 includes a hydraulic coupling 204 that operates to rotatively couple the axle shafts 46 and 48 driven by the front prop shaft 44.

The hydraulic coupling 204 includes a casing 206 of a hollow construction that is rotatable within the housing 202 about a rotational axis A and connected to one of the axle shafts, which in the illustrated embodiment is the right axle shaft 48, with the connection being provided by a planetary gear set 208 that is of the bevel gear planetary type. The casing 206 includes a cup-shaped member 210 and a cap member 212 which each have peripheral flanges secured to each other by circumferentially spaced bolts 214 that also secure a ring gear 216 of the bevel type which is rotatively driven by a bevel driving portion 218 of the front prop shaft 44.

The hydraulic coupling 204 includes a hydraulic pump 220 located within the casing 206 along the rotational axis A and including a pumping component embodied by an impeller 222 having external teeth 223. The hydraulic pump also includes an internal ring gear 224 mounted for rotation eccentrically with respect to the toothed impeller 222 and including internal teeth 226 of a number that is one more than the impeller teeth 223 and which are in a meshing relationship with the impeller teeth 223 to provide a pumping action upon relative rotation between the casing 206 and the toothed impeller 222.

The casing 206 has in inlet 228 through which hydraulic fluid is pumped into the casing 206 by the hydraulic pump 220. As illustrated in FIG. 4, there are actually two such inlets 228 such that the pumping takes place in both directions of relative rotation between the rotary member embodied by the axle shaft 46 and the casing 206. In this connection, each of the inlets 228 includes an associated check valve 230 for opening and closing inlet bores (not shown) of varying size along the direction of rotation.

A clutch 232 is received within the cup-shaped member 210 of casing 206 adjacent the junction thereof with the cap member 212 of the casing 206. Within the casing cap member 212, a pump housing insert 234 is mounted and receives the hydraulic pump 220 as well as interfacing with the clutch 232. This insert 234 has an annular piston chamber 236 that receives a clutch actuating piston 238 that engages the clutch 232 to couple the casing 206 with the left axle shaft 46. The insert 234 also has a wall defining a pair of transfer ports 240 through which hydraulic fluid is pumped from the hydraulic pump 220 to the clutch actuating piston 238 within the piston chamber 236. This flow through the transfer ports 240 is through one of the transfer ports upon one direction of relative rotation between the impeller 223 and the ring gear 224 and is through the other transfer port during the other direction of relative rotation between the impeller 223 and the ring gear 224. Each of the transfer ports 240 has an associated check valve 242. These check valves 242 ensure that the hydraulic fluid pumped though either transfer port to the clutch actuating piston 238 is not pumped back into the hydraulic pump 220 through the other transfer port.

An outlet port 244 is located on the clutch actuating piston 238. A control valve 246 operates to close the outlet port 244 when the pumped fluid reaches a predetermined pressure which is proportional to the relative rotation between the pump impeller 223 and ring gear 224 and thus corresponds to the relative rotation between the right axle shaft 48 connected through the differential unit 22 to the casing 206 and the left axle shaft 46 that is connected to the impeller 223. As the pumped hydraulic fluid reaches the predetermined pressure, the valve 246 closes and thereby prevents the hydraulic fluid from being pumped from the hydraulic pump 220. This causes the hydraulic pump 220 to act as a brake by coupling the impeller 223 with the internal ring gear 224 and thereby also couples the right and left axle shafts 48 and 46 to each other.

The clutch 232 includes alternating sets of clutch plates 248 and 250. One of the sets of clutch plates 248 has outer peripheries with spline connections 252 to the casing 206. The other set of clutch plates 250 has a central opening with spline connections 254 to the axle shaft 46 which also has spline connections 256 to the impeller 222 on the opposite side of the insert 234 from the clutch 232. Pumped hydraulic fluid acting on the clutch piston 238 functions to compress the sets of clutch plates 248 and 250 to provide the coupling between the casing 206 and the axle shaft 46.

The planetary gear set 208 is positioned on the opposite side of a casing wall 256 from the clutch 232 and includes a pair of side gears 258 and 260 which have respective spline connections 262 and 264 to axle shafts 46 and 48. The planetary gears 266 of the gear set 208 are each meshed with the pair of side gears 258 and 260 and are rotatably supported by a cross pin 268 that extends through the rotational axis A between opposite sides of the case 206. The planetary gear set 208 provides a differential action between the axle shafts 46 and 48 until the hydraulic pump 220 actuates the clutch 232 to couple axle shaft 48 to axle shaft 46.

Similarly, the rear inter-axle differential unit 24 is part of a rear axle assembly having left and right axle shafts 47 and 49 which are driven by a rear prop shaft 50. The rear output shaft 50 is coupled to the front output shaft 36 through a CV joint 52. As noted above, the construction and operation of the rear inter-axle differential unit 24 is otherwise identical to the front inter-axle differential unit 22.

Figure 6:
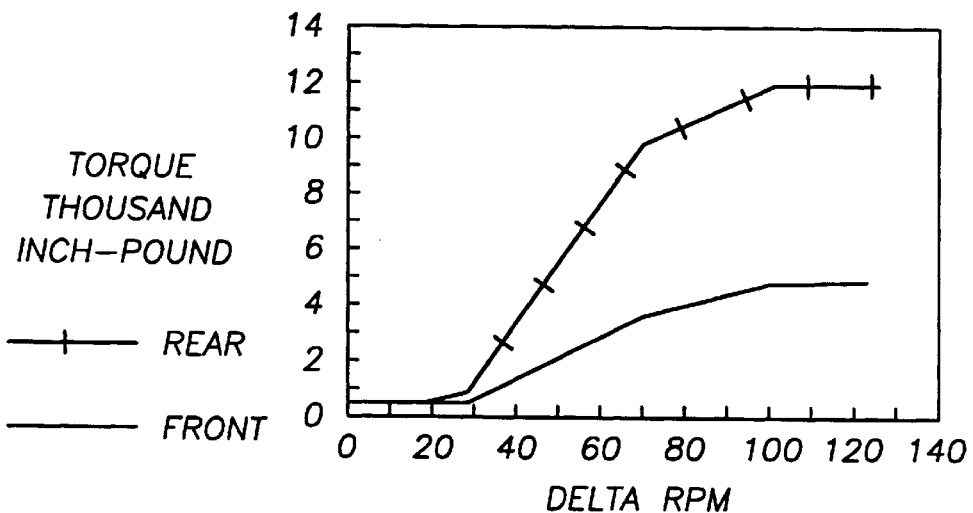
FIG. 6 is a graph of torque verses delta wheel revolutions per minute (RPM) for the axle shafts of the front and rear axle assemblies of the system of controlling torque transfer of the preferred embodiment of the present invention.

Turning to FIG. 6, a graphical representation of the torque transfer between the axle shafts of the front and rear axle assemblies is shown throughout a range of RPM differential. In the exemplary embodiment, the front and rear inter-axle differential units 22 and 24 both permit a differential rotation of approximately 0 to 25 RPM without activating the coupling to further transfer torque between the associated shafts. This differential allows for the vehicle 11 to maneuver at low speeds, for example, to park. At a first predetermined speed differential between the axle shafts, the front inter-axle differential unit 22 begins to transfer torque therebetween. The first predetermined speed differential in the exemplary embodiment is shown to be approximately 25 RPM at which point the torque transfer increases at a first rate. In the exemplary application, the torque transfer increases at a fixed rate within certain delta RPM regions. However, it will be appreciated that the rate of increase can alternatively define any other function, including but not limited to a smooth, continuous curve. It will be also be understood that the first and second speed differentials could be different. At a second predetermined speed differential between the rear axle shafts 47 and 49, the rear inter-axle differential unit 24 begins to transfer torque at a second rate. In the exemplary embodiment, the second predetermined speed differential is also approximately 25 RPM. The torque transferred between the rear axle shafts 47 and 49 increases at a fixed rate within certain delta RPM regions. Again, it will be appreciated that the rate of torque transfer increase can define any other function, including but not limited a smooth, continuous curve. In the exemplary application, the rate of torque transfer between the rear axle shafts 47 and 49 is more aggressive than the rate of torque transfer between the front axle shafts 46 and 48.

Figure 7:
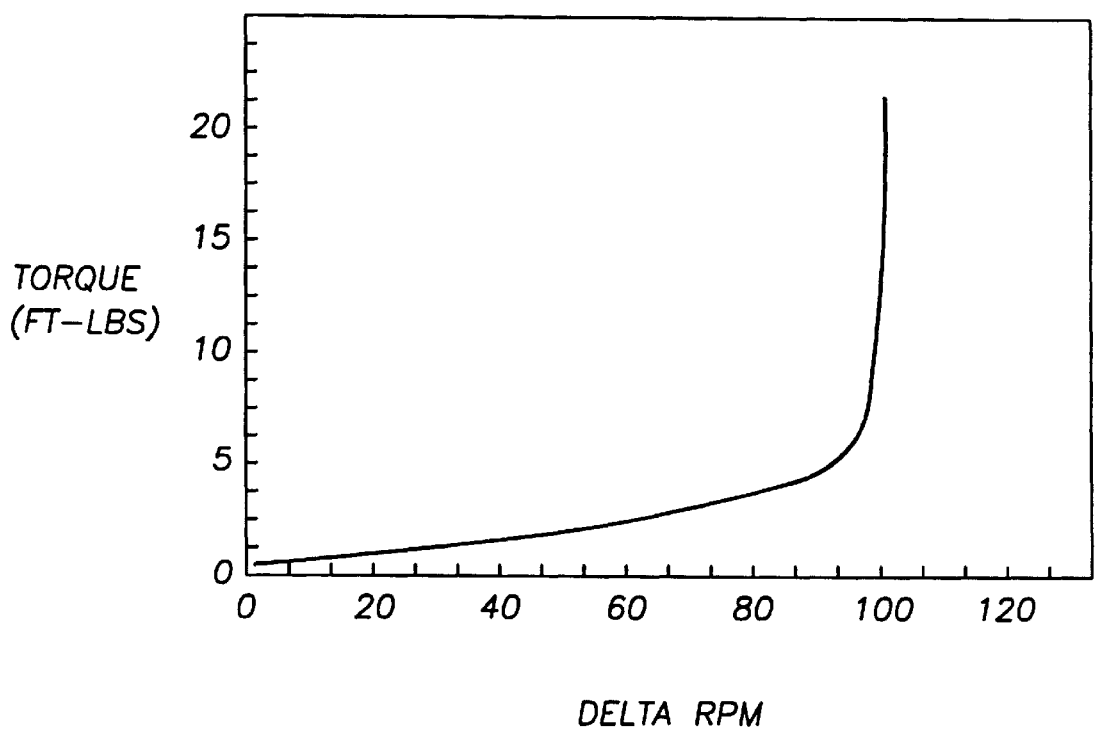
FIG. 7 is a graph of torque verses delta RPM for the front and rear output shafts of the system of controlling torque transfer of the preferred embodiment of the present invention.

With particular reference to FIG. 7, the transfer case 20 of the present invention is shown in the exemplary embodiment to be tuned so as to almost immediately begin to transfer torque between the front and rear output shafts 36 and 32. The torque is progressively and gradually increased as the RPM differential between the front and rear output shafts 36 and 32 increases from 0 to approximately 100. At a RPM differential between the front and rear output shafts 36 and 32 of approximately 100, torque is transferred therebetween aggressively at a third rate. In the exemplary embodiment, the front and rear output shafts 36 and 32 are almost directly coupled at this third predetermined speed differential (i.e., approximately 100 RPM). A line extending directly vertical in FIG. 7 would be indicative of a direct coupling between the front and rear output shafts 36 and 32. Again, it will be appreciated that the third rate of torque transfer increase can define any function.

Various factors may be modified to affect tuning of the transfer case 20 and the inner-axle differential units 22 and 24 to accomplish the desired performance of the system 10 of the present invention. These factors include but are not limited to clutch plate size and number, piston area, gerotor pump width, gerotor pump clearances, and bleed path size. Modification of these factors to arrive at a desired torque transfer curve will be understood to be within ordinary skill in the art.

Cooperative and independent tuning of the viscous couplings of the front and rear differential units 22 and 24 and the transfer case 20 allows for the automatic and independent transfer of torque between the wheels 12 and 14. The exemplary tuning described is transparent at low speeds to allow for easy vehicle maneuvering. At high speeds, torque is directed to the wheel(s) having superior traction. The transfer of torque between the front wheels 12 is less aggressive than the transfer of torque between the rear wheels.

Figure 8:
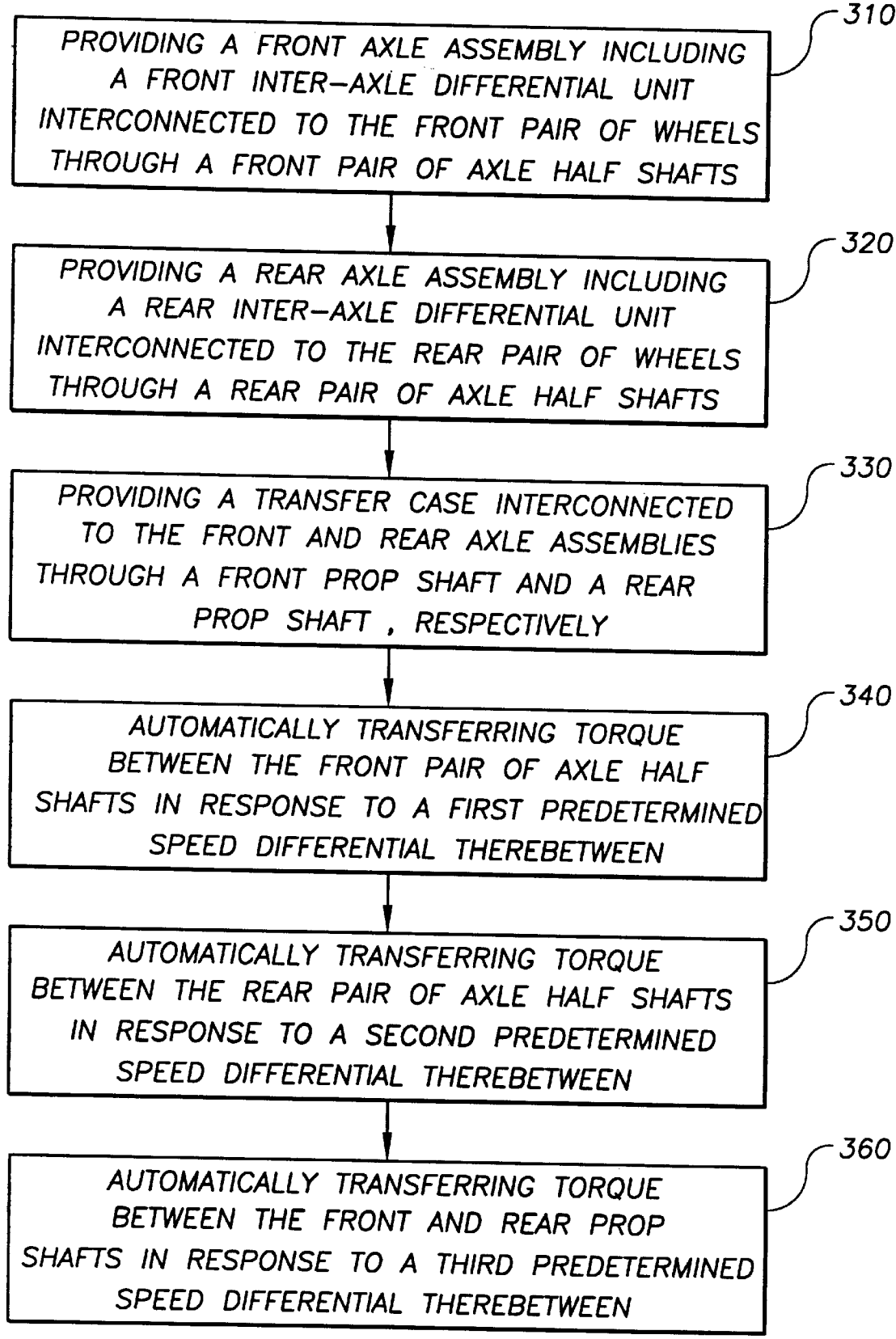
FIG. 8 is a schematic illustration of the general steps of a method of the present invention.

With particular reference to FIG. 8, the method of the present invention is shown to include a first general step 310 of providing a front axle assembly including a front inter-axle differential unit 22 interconnected to the front pair of wheels 12 through a front pair of axle shafts 46 and 48. In a second general step 320, the method of the present invention provides a rear axle assembly including a rear inter-axle differential unit 24 interconnected to the rear pair of wheels 14 through a rear pair of axle shafts 47 and 49. In a third general step 330, the method of the present invention provides a transfer case 20 interconnected to the front and rear axle assemblies through a front prop shaft 45 and a rear prop shaft 50, respectively. In a fourth general step 340, the method of the present invention automatically transfers torque between the front pair of axle shafts 46 and 48 in response to a first predetermined speed differential therebetween. In a fifth general step 350, the method of the present invention automatically transfers torque between the rear pair of axle shafts 47 and 49 in response to a second predetermined speed differential therebetween. In a sixth general step 360, the method of the present invention automatically transfers torque between the front and rear prop shafts 45 and 50 in response to a third predetermined speed differential therebetween.

In operation, the system 10 of the present invention functions to deliver substantially all the drive torque generated by the engine 11 to one or more non-slipping wheels. The drive torque may be directed to any combination of tractive wheels in proportion to their speed. The system 10 provides significant performance advantages over conventional systems, including but not limited to those which are electronically controlled and rely upon ABS technology to limit differential speed. For example, under extreme driving conditions such as when the vehicle 11 is ascending a steep grade and three of the four wheels are simultaneously on non-tractive surfaces, the system 10 functions to deliver substantially all the torque generated by the engine 16 to the remaining non-slipping or tractive wheel.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A method for transferring drive torque in a motor vehicle having a front pair of wheels and a rear pair of wheels, the method comprising the steps of:

providing a front axle assembly including a front differential unit interconnected to the front pair of wheels through a front pair of axle shafts;

providing a rear axle assembly including a rear differential unit interconnected to the rear pair of wheels through a rear pair of axle shafts;

providing a transfer case interconnected to said front and rear axle assemblies through a front prop shaft and a rear prop shaft, respectively;

automatically transferring drive torque between said front pair of axle shafts in response to a first predetermined speed differential therebetween;

automatically transferring drive torque at a first rate between said rear pair of axle shafts in response to a second predetermined speed differential therebetween; and automatically transferring drive torque at a second rate between said front and rear prop shafts in response to a third predetermined speed differential therebetween, said second rate being more aggressive than said first rate.

2. The method for transferring drive torque in a motor vehicle of claim 1, further including the step of automatically directing substantially all drive torque to a selected wheel of said first and second pairs of wheels.

3. In a motor vehicle having a front pair of wheels and a rear pair of wheels, a system for transferring drive torque to the front and rear pairs of wheels, the system comprising:

a front axle assembly including a front differential unit interconnected to the front pair of wheels through a front pair of axle shafts, said front differential operative for automatically transferring drive torque between the front pair of axle shafts;

a rear axle assembly including a rear differential unit interconnected to the rear pair of wheels through a rear pair of axle shafts, said rear differential operative for automatically transferring drive torque between the rear pair of axle shafts; and a transfer case interconnected to said front and rear axle assemblies through a front prop shaft and a rear prop shaft, respectively, said transfer case including a torque transfer mechanism for automatically transferring drive torque between said front and rear prop shafts;

wherein said front differential unit transfers drive torque between said front pair of axle shafts at a first rate in response to a first speed differential therebetween, wherein rear differential unit transfers drive torque at a second rate between said rear pair of axle shafts in response to a second speed differential therebetween, said second rate being more aggressive than said first rate.

4. The system for transferring drive torque of claim 3, wherein said front differential unit and said rear differential unit include first and second hydraulic couplings, respectively.

5. The system for transferring drive torque of claim 3, wherein said transfer mechanism operates to automatically increase the transfer of drive torque between said front and rear prop shafts in response to a speed differential therebetween.

6. The system for transferring drive torque of claim 3, wherein said transfer mechanism operates to automatically transfer drive torque at a third rate between said front and rear prop shafts in response to a third speed differential therebetween, said third rate being more aggressive than said second rate.

7. The system for transferring drive torque of claim 3, wherein said transfer case includes a third hydraulic coupling operatively interconnecting said front and rear prop shafts.

8. The system for transferring drive torque of claim 3, wherein said front differential unit transfers drive torque between said front pair of axle shafts at a first rate and transfers drive torque between said rear pair of axle shafts at a second rate, said second rate being more aggressive than said first rate.

9. The system for transferring drive torque of claim 3, wherein said second rate is more aggressive than said first rate.

10. The system for transferring drive torque of claim 9, wherein said transfer mechanism operates to automatically transfer drive torque at a third rate between said front and rear prop shafts in response to a third speed differential therebetween, said third rate being more aggressive than said second rate.

11. In a motor vehicle having a front pair of wheels and a rear pair of wheels, a system for transferring drive torque to the front and rear pairs of wheels, the system comprising:

a front axle assembly including a front differential unit interconnected to the front pair of wheels through a front pair of axle shafts, said front differential having a hydraulic coupling operative for automatically transferring drive torque between the front pair of axle shafts;

a rear axle assembly including a rear differential unit interconnected to the rear pair of wheels through a rear pair of axle shafts, said rear differential having a hydraulic coupling operative for automatically transferring drive torque between the rear pair of axle shafts; and a transfer case interconnected to said front and rear axle assemblies through a front prop shaft and a rear prop shaft, respectively, said transfer case including a hydraulic coupling for automatically transferring drive torque between said front and rear prop shafts;

wherein said front differential unit operates to transfer drive torque between said front pair of axle shafts in response to a first speed differential therebetween, wherein the rear differential unit operates to transfer drive torque between said rear pair of axle shafts in response to a second speed differential therebetween.

* * * * *